UNITED STATES PATENT OFFICE

FREDERICK H. BOUSFIELD, OF SAN FRANCISCO, CALIFORNIA.

IMPROVEMENT IN REFINING BASE-METAL BULLION.

Specification forming part of Letters Patent No. 162,891, dated May 4, 1875; application filed March 17, 1875.

*To all whom it may concern:*

Be it known that I, FREDERICK H. BOUSFIELD, of San Francisco city and county, State of California, have invented a Process for Beneficiating Base-Metal Bullion; and I do hereby declare the following description and accompanying drawings are sufficient to enable any person skilled in the art or science to which it most nearly appertains to make and use my said invention, without further invention or experiment.

The metal to which my process has especial reference is essentially an alloy of gold, silver, and copper, and silver and copper in variable proportions, and apt to contain, besides, an appreciable percentage of other metals coming under the general denomination of "base." These alloys or mixtures of metals are produced in the various processes of gold and silver extraction from their ores in the art and in the minting of money.

The purification or refining of such mixtures has hitherto been effected by various processes, all of which have necessitated the consumption or waste of a certain amount of the oxidizing medium, whether nitric acid, sulphuric acid, or a mixture of both acids. In my process this waste is entirely obviated, and the necessary oxidation brought about by an entirely different method, eminently simple and economical.

The process is, strictly speaking, a concentration of the fine metals, as the gold and silver remain intact, while the base ones only are removed, so that it may be regarded as a cheap preliminary operation preparatory to the final separation of each metal. It consists of five distinct operations, viz., first, melting and preparing the metal for operation No. 2 and granulation; second, roasting the granulations; third, leaching the roasted mass with weak sulphuric acid; fourth, subsequent leaching with brine; fifth, melting into fine bars.

The success of the whole operation depends upon the roasting of the granulated metal, which is insured by what I regard as the feature in this invention, and which I now proceed to describe.

To bring about a complete roasting, or the oxidation of the maximum amount of copper, it is necessary (if the bullion does not already contain it) to add two to five per cent. of lead, or sufficient leady bullion to bring it up to this proportion before granulating. This causes the metal to effloresce, and form a spongy porous mass in the roasting, whereby the oxidation is greatly and rapidly promoted. Without this addition the most prolonged exposure to the oxidizing influence of a furnace will only secure a partial conversion of a film-like character, which protects the rest of the metal from the beneficial influence, and fails to secure more than a minimum of oxides. The granulations should be pretty fine, which is effected by pouring the molten metal through perforated ladles into cold water.

The furnacing or roasting is carried on, by choice, in a muffled furnace, somewhat similar to those now in use at the wet-extraction works for the roasting of copper ores, and which is simply an enlarged form of which the chemist's muffle-furnace is the type.

The leaching with weak sulphuric acid renders the oxide of copper easily soluble. It has only to be concentrated by evaporation for the crystalized sulphate of copper to separate, and be at once a marketable article. It is effected in lead-lined tanks or vats heated with steam.

The leaching with brine, which is to be hot and concentrated, is for the purpose of removing the lead, which has been successively converted into oxide by the furnacing, and sulphate by the sulphuric acid, of the previous operation.

The brine is to be contained in wooden tanks, and changed from time to time. The completion of this portion of the operation may be readily ascertained by a portion of the brine solution failing to give a white precipitate with solution of liquid ammonia.

The last part of the process consists in washing the spongy mass once or twice with hot water, drying and fusing with borax in an ordinary plumbago or clay crucible, and casting into bars.

By this process I have succeeded in refining bullion containing sixty per cent. up to .995 fine, or within five one-thousandths of purity. The process is also applicable to the refining of base-metal amalgams, as, by incorporating the proper amount of lead amalgam with the base-metal amalgam previous to retorting, the same efflorescence and spongification and oxidation are brought about by removing the door of the retort, and exposing the mass to the continued action of the heat subsequent to the completion of the retorting proper. The metal will then be found in a condition admitting of the after processes of leaching.

Having thus described my invention, what I claim, and desire to secure by Letters Patent, is—

The process herein described for refining bullion—that is, by adding, while melted, lead to the amount of about two to five per cent., granulating the alloy, roasting the granules, and subsequently leaching with the sulphuric acid, and then brine, substantially as set forth.

FEEDERICK H. BOUSFIELD.

Witnesses:
 JNO. L. BOONE,
 C. M. RICHARDSON.